United States Patent
Sato et al.

[11] Patent Number: 6,002,462
[45] Date of Patent: Dec. 14, 1999

[54] LIQUID CRYSTAL DISPLAY DEVICE WITH ELECTRODES CORRESPONDING TO CHANNEL REGION AND DISPLAY REGION AND COLORED LAYERS BEING FORMED ON THE ELECTRODES

[75] Inventors: Takashi Sato, Tenri; Sayuri Fujiwara, Nara, both of Japan

[73] Assignee: Sharp Kabushiki Kaisha, Osaka, Japan

[21] Appl. No.: 08/991,545

[22] Filed: Dec. 16, 1997

[30] Foreign Application Priority Data

Dec. 26, 1996 [JP] Japan ................................. 8-347047

[51] Int. Cl.⁶ ....................... G02F 1/1335; G02F 1/1333; G02F 1/136
[52] U.S. Cl. ............................... 349/106; 349/110; 349/42
[58] Field of Search ................................. 349/106, 110, 349/111, 42, 43, 44; 257/59, 72

[56] References Cited

U.S. PATENT DOCUMENTS

| | | | |
|---|---|---|---|
| 5,084,905 | 1/1992 | Sasaki et al. | 357/7 |
| 5,585,951 | 12/1996 | Noda et al. | 349/122 |
| 5,641,974 | 6/1997 | Den Boer et al. | 257/59 |
| 5,748,266 | 5/1998 | Kodate | 349/106 |
| 5,818,550 | 10/1998 | Kadota et al. | 349/43 |
| 5,847,792 | 12/1998 | Kobayshi et al. | 349/44 |
| 5,850,271 | 12/1998 | Kim et al. | 349/106 |
| 5,854,663 | 12/1998 | Oh et al. | 349/42 |
| 5,866,919 | 2/1999 | Kwon et al. | 349/110 |
| 5,919,532 | 7/1999 | Sato et al. | 349/106 |

FOREIGN PATENT DOCUMENTS

| | | |
|---|---|---|
| 64-21481 | 1/1989 | Japan . |
| 7-72473 | 3/1995 | Japan . |

*Primary Examiner*—William L. Sikes
*Assistant Examiner*—Tarifur R. Chowdhury
*Attorney, Agent, or Firm*—Nixon & Vanderhye, P.C.

[57] ABSTRACT

A liquid crystal display device includes an insulative substrate; an active matrix element formed on the insulative substrate; wiring formed on the insulative substrate for supplying a signal to the active matrix element; an electrode formed on the insulative substrate so as to be electrically coupled to the active matrix element; an insulation layer formed so as to at least partially overlay the wiring and the active matrix element; a first electrode formed above the insulation layer so as to correspond to a channel region of the active matrix element; a second electrode formed so as to correspond to a display region of a pixel; a colored layer formed on the first electrode; and a colored layer formed on the second electrode.

5 Claims, 5 Drawing Sheets

LIQUID CRYSTAL DISPLAY DEVICE WITH ELECTRODES CORRESPONDING TO CHANNEL REGION AND DISPLAY REGION AND COLORED LAYERS BEING FORMED ON THE ELECTRODES

BACKGROUND OF THE INVENTION

1. Field of the Invention

The present invention relates to a liquid crystal (LC) display device for use in audio-visual (AV) devices, office automation (OA) devices, etc., and a method for producing the same.

2. Description of the Related Art

A color LC display device for use in the display of a LC television apparatus, a lap-top type personal computer, a notebook type personal computer, or the like, typically incorporates a color filter such that the filter is formed of discrete colored layers disposed in a plane on an insulative substrate.

As a conventional color LC display device of the above-mentioned type, a device having the configuration shown in FIG. 5 is known. The color LC display device in FIG. 5 can be produced by sealing liquid crystal 24 between a color filter substrate 21 and a driving substrate 23 with a sealant 25. The color filter substrate 21 is produced by: forming respective colored layers 26 of the three primary colors, i.e., red (R), green (G), and blue (B); providing a black matrix 27 for preventing decrease in the contrast or color purity due to light leaking between the colored layers 26; smoothing the surface of the colored layers 26 and the black matrix 27 with a top coating 28; and providing a transparent electrode 29. The driving substrate 23 is produced by forming transparent driving electrodes 22 on a glass substrate 20.

The colored layers 26 of the color filter 21 may be produced by the following known methods, for example: a printing method, by which inks of RGB colors are printed on a glass substrate by means of a printing apparatus; a dispersion method, by which a ultraviolet-ray (UV ray) curable resist that contains pigments dispersed therein is applied on a glass substrate, followed by a repetition of a photolithography process for exposure through a mask and a heat curing process for each color of RGB, whereby pigment layers are formed; a dye method, by which a resist is formed through photolithography techniques for providing selective masking on gelatine so as to allow each color of RGB to be dyed with a dye; an electrodeposition method, by which an electrodeposition polymer material containing a pigment dispersed therein is applied on a substrate through electrodeposition by utilizing electrodes formed on the substrate; and a micell electrolysis method, by which a surfactant containing a pigment dispersed therein is electrolyzed by utilizing electrodes formed on a substrate.

A color LC display device is produced by attaching an active matrix substrate onto a color filter substrate, which requires positioning with high accuracy, thereby resulting in a decrease in the production yield. Furthermore, where the black matrix is designed with some margin, a decrease in the aperture ratio results.

In an attempt to solve the above-mentioned problems, Japanese Laid-Open Publication No. 64-21481 discloses a method for producing a color filter on an active matrix substrate by an electrodeposition method, which is illustrated with reference to FIGS. 6 to 8. FIG. 6 is a plan view illustrating a conventional LC display device. FIG. 7 is a cross-sectional view of the display device of FIG. 6 taken at line C—C. FIG. 8 is a cross-sectional view of the display device of FIG. 6 taken at line D—D. With reference to FIG. 7, a gate electrode 5 (of Cr, Ta, or the like) is formed on an insulative substrate 1 (e.g., glass). A gate insulation film 6 (e.g., $SiN_x$) is formed over the gate electrode 5. A semiconductor layer 7 of an undoped amorphous silicon, or the like, is formed on the gate insulation film 6 above the gate electrode 5, consecutively after which follows the formation of an insulation layer 10 on the semiconductor layer 7. Furthermore, over the respective ends of the semiconductor layer 7, amorphous silicon ($n^+$ type a-Si) layers 8a and 8b doped with phosphorous (P), for example, are formed. On the $n^{30}$ a-Si layers 8a and 8b, a source electrode 9a and a drain electrode 9b (of Ti or the like) are respectively formed. Thus, a thin film transistor (TFT) 3 functioning as a switching element is formed. Turning to FIG. 6, the gate electrode 5 is electrically coupled to a gate bus line 15 (of Ta or the like); the source electrode 9a is electrically coupled to a source bus line 16 (of Ta or the like); and the drain electrode 9b is electrically coupled to an electrode 12b for facilitating the formation of a color filter. The electrode 12b functions as a pixel electrode. The gate bus lines 15 and the source bus lines 16, which are formed in a matrix shape, are insulated from each other by the gate insulation film 6. Turning to FIG. 7, an organic resin protection film (insulation layer) 11 is further formed on the TFT 3, the gate bus lines 15, and the source bus lines 16 (not shown). A dye resist for forming a light-shielding layer 19 is formed on the insulation layer 11 by photolithography, and dyed black to form the light-shielding layer 19. Next, a voltage is applied to the gate bus lines 15 and the source bus lines 16 so as to activate the TFT 3, thereby allowing a color filter 13 to be formed in a desired color and in desired dot positions by electrodeposition. Furthermore, an alignment film 14 (of polyimide or the like) is formed on the color filter 13 and the light-shielding layer 19. The alignment film 14 is subjected to an alignment process through rubbing or other techniques.

On the other hand, a counter substrate may be prepared by forming a counter electrode 17 on an insulative substrate 2 (e.g., glass) with an alignment film 14 (of polyimide or the like) further formed there-upon. The alignment film 14 is subjected to an alignment process through rubbing or other techniques.

After the above-described processes, the substrate 1 having the color filter layers 13 and the TFTs 3 (i.e., switching elements) formed thereupon is attached onto the counter substrate having the counter electrode 17 thereon, with spacers (e.g., plastic beads) being dispersed in the interspace for retaining a constant distance between the substrates. The liquid crystal 4 is injected between the substrates, which are sealed with a sealant. Thus, a color LC display device has been produced.

According to this method, a color filter is formed on the active matrix substrate. Therefore, the effects of the color filter are well conserved regardless of possible positioning errors during the attachment of the active matrix substrate to the counter substrate. Since there is no need to allow any extra margin for the size of the color filter as such, the pixel aperture ratio can be improved.

However, according to the method described in Japanese Laid-Open Publication No. 64-21481, a dye resist is applied on the entire surface of the substrate so as to leave portions other than the pixel electrodes open to exposure, which is followed by dying the light-shielding layer 19 black. Since this exposure process is susceptible to some positioning error of the resist pattern, a light-shielding layer tends to also form on the pixel electrodes, thereby decreasing the effective pixel area (note that the pixel electrodes are utilized to define dots of the desired color filter during the electrodeposition process).

As a method for solving the above-mentioned problem, Japanese Laid-open Publication No. 7-72473 discloses an alternative method for forming a color filter on an active matrix substrate by electrodeposition. According to this method, active elements are activated so as to form a color filter including R, G, and B dots by electrodeposition; thereafter, a light-shielding layer is formed by a rear exposure method; and a light-shielding layer is further formed by electrodeposition on any electrode on which the rear exposure method cannot form a light-shielding layer. This method provides further improvement in the pixel aperture ratio.

However, the above method, which relies on a rear exposure method to form a light-shielding layer in an attempt to achieve a 100% effective pixel area, thus requires a further step of forming a light-shielding layer by electrodeposition on the light-shielding electrodes because the rear exposure method could not form a light-shielding layer thereon. This lengthens the production process and results in an increase in cost.

Moreover, in the case where there is a disruption in the wiring coupled to a signal electrode of R, G, or B is, the above method requires a correction process involving first fixing the disruption and then forming a color filter at least in the portions which were not appropriately colored due to the disruption, this process being repeated three times. As a result, the production process of the device may be considerably prolonged.

SUMMARY OF THE INVENTION

A liquid crystal display device according to the present invention includes: an insulative substrate; an active matrix element formed on the insulative substrate; wiring formed on the insulative substrate for supplying a signal to the active matrix element; an electrode formed on the insulative substrate so as to be electrically coupled to the active matrix element; an insulation layer formed so as to at least partially overlay the wiring and the active matrix element; a first electrode formed above the insulation layer so as to correspond to a channel region of the active matrix element; a second electrode formed so as to correspond to a display region of a pixel; a colored layer formed on the first electrode; and a colored layer formed on the second electrode.

In one embodiment of the invention, the colored layer formed on the first electrode is a light-shielding layer and the colored layer formed on the second electrode is a light-transmitting layer.

In another embodiment of the invention, the insulation layer is formed so as to overlay substantially all area covering the wiring, the active matrix element and a display region of the pixel, the first electrode and the second electrode being formed on the insulation layer.

In still another embodiment of the invention, the active matrix element is a thin film transistor, the first electrode being electrically coupled to a source electrode of the thin film transistor, and the second electrode being electrically coupled to a drain electrode of the thin film transistor.

In still another embodiment of the invention, the colored layer formed on the first electrode has a thickness which is substantially equal to a cell thickness.

A method for producing a liquid crystal display device according to the present invention includes the steps of: forming an active matrix element and wiring formed on an insulative substrate; forming an insulation layer so as to at least partially overlay the wiring and the active matrix element; forming a first electrode above the insulation layer so as to correspond to a channel region of the active matrix element; forming a second electrode so as to correspond to a display region of a pixel; and forming a colored layer formed on each of the first electrode and the second electrode by an electrochemical method.

In one embodiment of the invention, the method further includes the step of: examining electric connection failure at least between the active matrix element, the wiring, and the first and second electrodes formed on the insulative substrate, the examination being based on a state of the colored layer having formed on the first electrode and/or on the second electrode.

In another embodiment of the invention, the colored layer formed on the second electrode is formed after the colored layer is formed on the first electrode.

In still another embodiment of the invention, the electrochemical method is an electrodeposition method.

In still another embodiment of the invention, the electrochemical method is a micell electrolysis method.

In still another embodiment of the invention, the first electrode and the second electrode are simultaneously formed.

In still another embodiment of the invention, the colored layer formed on the first electrode is a light-shielding layer and the colored layer formed on the second electrode is a light-transmitting layer.

In still another embodiment of the invention, the insulation layer is formed so as to overlay substantially all area covering the wiring, the active matrix element and a display region of the pixel, the first electrode and the second electrode being formed on the insulation layer.

In still another embodiment of the invention, the active matrix element is a thin film transistor, the first electrode being electrically coupled to a source electrode of the thin film transistor, and the second electrode being electrically coupled to a drain electrode of the thin film transistor.

In still another embodiment of the invention, the colored layer formed on the first electrode has a thickness which is substantially equal to a cell thickness.

Thus, the liquid crystal display device according to the present invention includes: an insulative substrate; an active matrix element formed on the insulative substrate; wiring formed on the insulative substrate for supplying a signal to the active matrix element; an electrode formed on the insulative substrate so as to be electrically coupled to the active matrix element; an insulation layer formed so as to at least partially overlay the wiring and the active matrix element; a first electrode formed above the insulation layer so as to correspond to a channel region of the active matrix element; a second electrode formed so as to correspond to a display region of a pixel; a colored layer formed on the first electrode; and a colored layer formed on the second electrode.

Thus, a first electrode can be provided in the form of an isolated island corresponding to the channel region of the active matrix element, and a second electrode can be provided so as to correspond to the display region of a pixel, separately from the first electrode corresponding to the channel region of the active matrix element. It is also possible to extend the first electrode and/or the second electrode to the vicinity of the active matrix element and the wiring, or even so as to overlay the active matrix element and the wiring to the extent that the first electrode and the second electrode are not electrically interconnected.

By forming a colored layer on each of such first and second electrodes by an electrochemical method, it becomes possible to increase the display area. Since the first electrode and the second electrode are electrically separate, it is possible to form different colored layers independently on the first electrode and the second electrode by employing, for example, an electrodeposition method. It is possible to accurately control the thicknesses and positions of the respective colored layers by employing an electrochemical method such as an electrodeposition method.

By employing a light-shielding layer for the colored layer formed on the first electrode and a light-transmitting layer for the colored layer formed on the second electrode (so that the latter colored layer will function as a color filter), it becomes possible to prevent light from leaking from above the active matrix element while achieving a color filter function, thereby improving the contrast during display. It is also possible to prevent the deterioration in the characteristics of the active matrix element due to a leak current caused by light entering the channel region of the active matrix element.

By forming the insulation layer so as to overlay substantially all area covering the wiring, the active matrix element and a display region of the pixel, the first electrode and the second electrode being formed on the insulation layer, it becomes possible to form the first and second electrodes on substantially the same plane. As a result, it becomes possible to form the second electrode so as to partially overlay the wiring, thereby increasing the aperture ratio. Furthermore, the production process can be shortened and the production cost can be reduced by simultaneously forming the first and second electrodes.

By employing a thin film transistor as the active matrix element, the first electrode being electrically coupled to a source electrode of the thin film transistor, and the second electrode being electrically coupled to a drain electrode of the thin film transistor, it becomes possible, in the case of forming colored layers on the respective electrodes by an electrochemical method (e.g., an electrodeposition method), to selectively apply a voltage to either the first electrode or the second electrode. Thus, different colored layers can be independently formed on the first and second electrodes.

By ensuring that the colored layer formed on the first electrode has a thickness which is substantially equal to a cell thickness, the colored layer can function as a spacer for retaining the distance (interspace) between the substrates, thereby eliminating the need for dispersing spacers. This colored layer can also function as a light-shielding layer for the active matrix element. Since it is unnecessary to disperse spacers, the production process can be simplified, and the yield-lowering problems inherent in the spacer dispersion process, e.g., clustering, can be eliminated.

By forming a colored layer on the first electrode by using an electrochemical method such as an electrodeposition method, it becomes possible to accurately control the thicknesses of the colored layer, ensure that the colored layer is accurately positioned on the first electrode, and control the cell thickness of the liquid crystal display device so as to obtain evenness. As a result, the portion of the colored layer functioning as a spacer will not be formed in the display region. Thus, it is possible to minimize the problem of display coarseness induced by the presence of spacers, and the problem of uneven display due to misalignment of liquid crystal molecules at the interfaces between the spacers and the liquid crystal. Since the colored layer that functions as a spacer can be fixed on the first electrode by an electrochemical method, e.g., an electrodeposition method, this spacer will not move about during the injection of liquid crystal. As a result, problems such as misalignment of liquid crystal molecules due to wandering of the spacer, non-uniform cell thickness, and clustering of spacers can be prevented.

The method for producing a liquid crystal display device according to the present invention includes the steps of: forming an active matrix element and wiring formed on an insulative substrate; forming an insulation layer so as to at least partially overlay the wiring and the active matrix element; forming a first electrode above the insulation layer so as to correspond to a channel region of the active matrix element; forming a second electrode so as to correspond to a display region of a pixel; and forming a colored layer formed on each of the first electrode and the second electrode by an electrochemical method. Thus, the colored layers can be formed by an electrochemical method, e.g., an electrodeposition method, by utilizing an electrode for driving the liquid crystal as an electrode for facilitating the formation of the colored layer. As a result, reduction in the aperture area due to a pattern mislocation error typically occurring in a photolithography step is prevented, and highly uniform colored layers can be formed, so that a liquid crystal display device having a high aperture ratio and high contrast can be produced.

Furthermore, it is possible to simultaneously form the second electrode (i.e., a pixel electrode) and the first electrode (i.e., an electrode for facilitating the formation of the light-shielding layer of the active matrix element). In the case where the active matrix element is a TFT, the first electrode is electrically coupled to the source electrode of the TFT, so that a light-shielding layer can be formed over all the portions where it is necessary to shield light, corresponding to all of the RGB, by simply applying a source signal. In other words, there is no need to form a further support member for facilitating the formation of a light-shielding layer, whereby the production process can be shortened and the material cost can be reduced without lowering the aperture ratio of the liquid crystal display device. Since it is unnecessary to apply an additional portion of a dye resist for forming a further pattern as would be required under the prior art, it is possible to produce an inexpensive liquid crystal display device with a high aperture ratio.

By further performing a step of examining electric connection failure at least between the active matrix element, the wiring, and the first and second electrodes formed on the insulative substrate (the examination being based on a state of the colored layer having formed on the first electrode and/or on the second electrode), it becomes possible to examine electrical connection failures between the active matrix element, the wiring, and the first electrode and/or the second electrode immediately after forming the colored layer on the electrode. Thus, there is no need to conduct a further examination after the completion of the entire liquid crystal display device. In other words, the production process of the liquid crystal display device is advantageously exempted from processing insufficiently formed substrates, thereby reducing redundancy in cost. Furthermore, by providing feedback on any production defect, it becomes possible to immediately detect troubles occurring in the production steps, thereby facilitating the correction of the defects in time for the accomplishment of liquid crystal display devices.

By forming the colored layer on the second electrode after the colored layer is formed on the first electrode, it becomes possible to form colored layers independently on the first electrode and the second electrode. As a result, in the case where there are disruptions in the source wiring, or there is electric leakage between the source wiring and the gate wiring or between the source wiring and the storage capacitance wiring used for maintaining the ON state of the liquid crystal, it is possible to detect such defects after having formed the colored layer on the first electrode, which may then be immediately corrected. Therefore, in the case of forming three colors of colored layers on the second electrode, if there are defects in at least two colors, the production process can be substantially shortened and the material cost can be reduced, as compared to what is required by the conventional methods in which the colored layers must be formed before examining and correcting defects, and multiple steps of electrodeposition for forming the colored layers must be conducted.

Thus, the invention described herein makes possible the advantages of: (1) providing a liquid crystal display device having a high aperture ratio and high contrast; (2) providing a liquid crystal display device requiring substantially no spacers such that misalignment of liquid crystal molecules due to wandering of the spacer, non-uniform cell thickness, and clustering of spacers can be prevented; and (3) providing a liquid crystal display device which can be produced through a shorter process and at lower cost than a conventional liquid crystal display device.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of examples, with reference to the accompanying figures.

EXAMPLE 1

Figure 1:
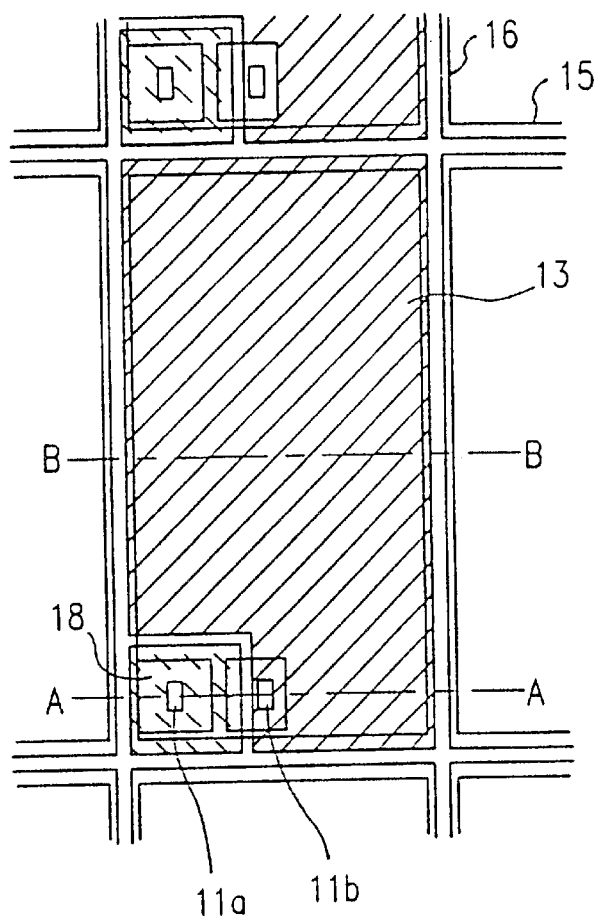
FIG. 1 is a schematic plan view illustrating a LC display device according to an example of the present invention.
Figure 2:
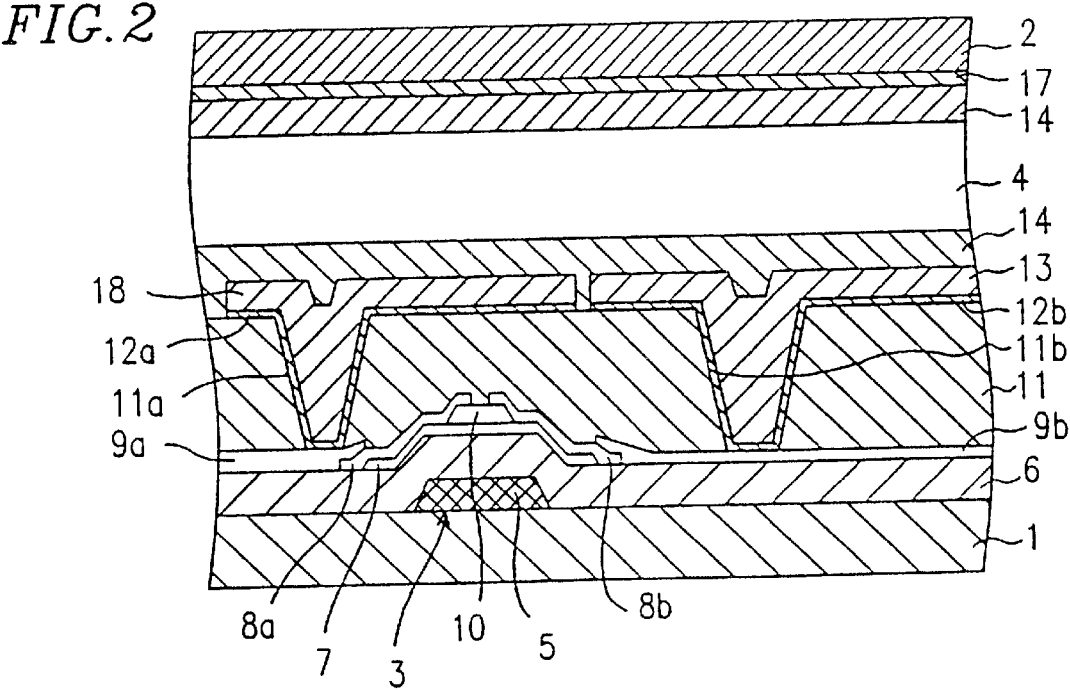
FIG. 2 is a cross-sectional view of the display device of FIG. 1 taken at line A—A.
Figure 3:
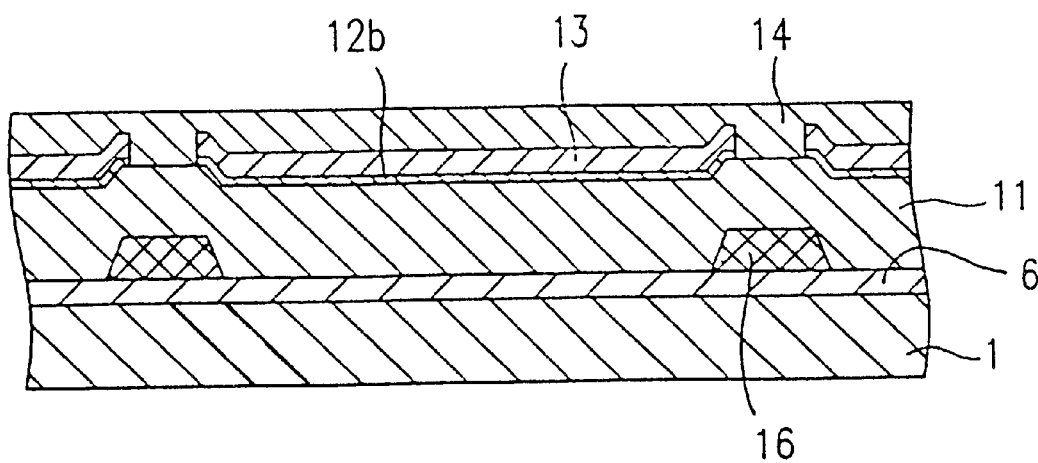
FIG. 3 is a cross-sectional view of the display device of FIG. 1 taken at line B—B.

A LC display device incorporating an active matrix substrate according to a first example of the present invention will be described with reference to FIGS. 1, 2, and 3. FIG. 1 is a schematic plan view illustrating an active matrix substrate of a LC display device according to an example of the present invention. FIG. 2 is a cross-sectional view of the display device of FIG. 1 taken at line A—A. FIG. 3 is a cross-sectional view of the display device of FIG. 1 taken at line B—B. The active matrix substrate includes TFTs 3 arranged in a matrix shape on an insulative substrate 1 and electrodes 12b (pixel electrodes) for facilitating the formation of color filters by being activated/deactivated by the action of the TFT 3.

With reference to FIG. 2, a gate electrode 5 (of Ta, or the like) is formed on an insulative substrate 1 (e.g., glass). A gate insulation film 6 (e.g., $SiN_x$) is formed over the gate electrode 5. A semiconductor layer 7 of an undoped amorphous silicon (a-Si), or the like, is formed on the gate insulation film 6 above the gate electrode 5. An insulation layer 10 is further formed on the semiconductor layer 7. Furthermore, over the respective ends of the semiconductor layer 7, amorphous silicon ($n^+$ type a-Si) layers 8a and 8b doped with phosphorous (P), for example, are formed. On the $n^+$ a-Si layers 8a and 8b, a source electrode 9a and a drain electrode 9b (of Ti or the like) are respectively formed. Thus, a TFT 3 functioning as a switching element is formed. Turning to FIG. 1, the gate electrode 5 is connected to a gate bus line 15 (of Ta or the like), and the source electrode 9a is connected to a source bus line 16 (of Ta or the like). The gate bus lines 15 and the source bus lines 16, which are formed in a matrix shape, are insulated from each other by the gate insulation film 6.

An organic resin protection film 11 (of acrylic resin) is further formed above the entire region covering the TFT 3 excluding contact holes 11a and 11b, the pixel areas, the gate bus lines 15, and the source bus lines 16. Within a display region (i.e., each region surrounded by a gate bus line 16 and a source bus line 15 ), an electrode 12b (of ITO, i.e, indium tin oxide, or the like) for facilitating the formation of color filters is formed on the organic resin protection film 11. The electrode 12b functions as a pixel electrode, and is electrically coupled to the drain electrode 9b via the contact hole 11b. Color filters 13 having a predetermined pattern of R, G, and B are formed on the electrode 12b by an electrochemical method in a consecutive manner.

Above the TFT 3, an electrode 12a (of ITO or the like) for facilitating the formation of a light-shielding layer 18 is formed on the organic resin protection insulation film 11 so as to be electrically coupled to the source electrode 9a via the contact hole 11a. On the electrode 12a is formed the light-shielding layer 18 (of Cr) by an electrochemical method. Furthermore, an alignment film 14 (of polyimide or the like) is formed on the organic resin protection film 11, the light-shielding layer 18, and the color filters 13. The alignment film 14 is subjected to an alignment process through rubbing or other techniques so that the alignment film 14 becomes capable of aligning LC molecules.

On the other hand, a counter substrate is prepared by forming a counter electrode 17 on an insulative substrate 2, and an alignment film 14 (of polyimide or the like) on the counter electrode 17. The alignment film 14 is subjected to an alignment process through rubbing or other techniques so that the alignment film 14 becomes capable of aligning LC molecules.

Thereafter, the active matrix substrate is attached onto the counter substrate, with spacers (e.g., plastic beads) being dispersed in the interspace for retaining a constant distance between the substrates, and with sealants sealing the interspace. Liquid crystal 4 is injected, through an injection port provided in a portion of the seal, into the interspace between the substrates. After injection is completed, the injection port is sealed. Thus, a color LC display device has been produced.

This LC display device can function as a transmission type LC display device with light radiated from behind the LC display device so that the pattern of the transmitted light is controlled through the LC display device.

Next, a method for producing the LC display device according to the present invention, incorporating above-described active matrix substrate, will be described. FIGS. 4A to 4G are cross-sectional views illustrating production steps of the LC display device according to the present invention.

The description hereinafter will chiefly concern a portion corresponding to each pixel region.

Figure 4A:
FIGS. 4A to 4G are cross-sectional views illustrating some of the steps of production of a LC display device according to the present invention.

First, as shown in FIG. 4A, a TFT 3 is formed on an insulative substrate 1. Thereafter, a gate bus line 15 (not shown) and a source bus line 16 are formed so as to be electrically coupled to the TFT 3 as follows.

For example, a metal layer of Ta (thickness: 0.5 mm) is deposited on the insulative substrate 1 of glass or the like. Next, the metal layer is patterned by photolithography and etching to form a plurality of gate bus lines 15 extending in parallel to one another. It should be noted that a portion of the gate bus line 15 branching out from the main portion will function as a gate electrode 5 of the subsequently-formed TFT 3. Next, a gate insulation film 6 of $SiN_x$ (thickness: 0.5 $\mu$m) is deposited so as to overlay the gate bus line 15 and the portion to become the gate electrode 5 across the entire substrate surface. Upon a portion of the gate insulation film 6 formed above the gate electrode 5 branched out from the gate bus line 15, an undoped a-Si layer (thickness: 0.03 $\mu$m) to become a semiconductor layer 7 and a $SiN_x$ layer (thickness: 0.02 $\mu$m) to become an insulation layer 10 are consecutively deposited. The $SiN_x$ layer is patterned into a predetermined shape of the insulation layer 10, i.e, so as to remain only above the gate electrode 5. Next, an $n^+$ type a-Si layer doped with P, which is to become contact layers 8a and 8b, is deposited (thickness: 0.045 $\mu$m) by a plasma CVD method so as to overlay the insulation layer 10 across the entire substrate surface. Next, the $n^+$ type a-Si layer and the a-Si layer are patterned into predetermined shapes of the contact layers 8a and 8b, and the semiconductor layer 7, respectively. The contact layers 8a and 8b are formed to provide ohmic contact between a source electrode 9a/drain electrode 9b (to be formed later) and the semiconductor layer 7. At this point, the contact layers 8a and 8b are still continuous above the insulation layer 10. A Ti metal layer (thickness: 0.2 $\mu$m) is deposited over the entire substrate surface by sputtering, and patterned by etching to form the source electrode 9a and the drain electrode 9b. At this time, the portion connecting the contact layers 8a and 8b above the insulation layer 10 is also etched away so that the contact layers 8a and 8b become split to define portions extending below the source electrode 9a and the drain electrode 9b, respectively. Thus, the TFT 3 has been formed.

As shown in FIG. 1, the source bus lines 16 are formed concurrently with the formation of the source electrode 9a and the drain electrode 9b, so as to lie perpendicular to the gate bus lines 15.

Figure 4B:
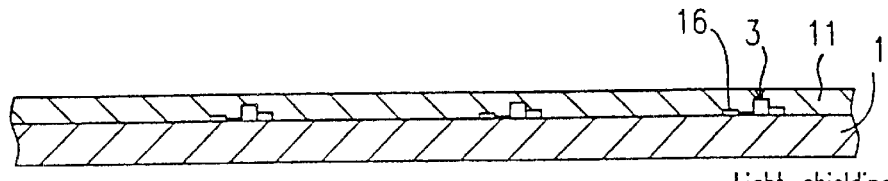

Next, as shown in FIG. 4B, an organic resin protection film 11 (of acrylic resin) is applied by a spinner to form a layer having a thickness of 4.0 $\mu$m across the entire surface of the insulative substrate 1, so as to overlay the TFTs 3, the source bus lines 16, and the gate bus lines 15.

Figure 4C:
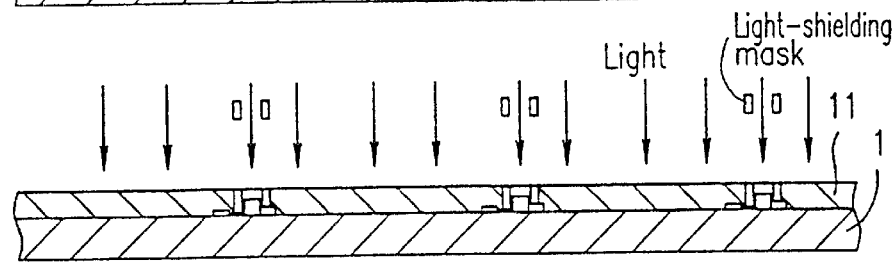

Next, as shown in FIG. 4C, the organic resin protection film 11 applied on the insulative substrate 1 is exposed to UV rays by a photolithography method using a light-shielding mask.

Figure 4D:
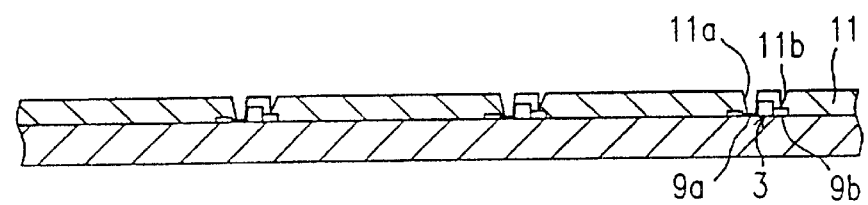

Next, as shown in FIG. 4D, the organic resin protection film 11 is etched to form the contact holes 11a and 11b so that they are electrically coupled to the source electrode 9a and the drain electrode 9b, respectively, upon the TFT 3.

Figure 4E:
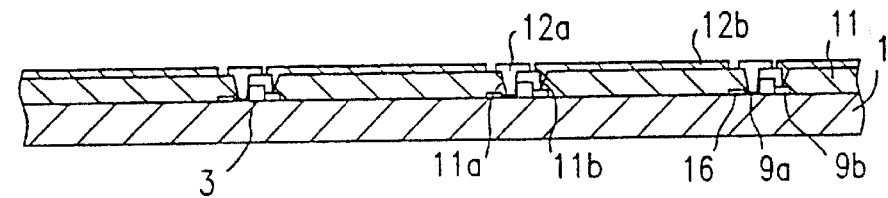

Next, as shown in FIG. 4E, an ITO film (thickness: 0.08 $\mu$m) is sputtered over the entire surface of the insulative substrate 1 (on which the organic resin protection film 11 has been formed with the contact holes 11a and 11b therein). The ITO film is patterned into a predetermined shape so that an electrode 12b (pixel electrode) for facilitating the formation of color filters and an electrode 12a for facilitating the formation of a light-shielding layer are formed so as to be electrically independent of each other. It will be appreciated that the color filters will define display portions in a matrix arrangement, whereas the light-shielding layer will shield light over the TFT 3. The electrode (pixel electrode) 12b is electrically coupled to the drain electrode 9b of the TFT 3. The electrode 12a is electrically coupled to the source electrode 9a of the TFT 3. Thus, by first forming the organic resin protection film 11 and then forming the electrode 12b (pixel electrode) for facilitating the formation of the color filters, it becomes possible to allow the electrode 12b to be formed in portions above the source bus line 16, the gate bus line 15 and the TFT 3 where it would otherwise be difficult to form the electrode 12b. Thus, the structure according to the present invention contributes to substantial improvement in the aperture ratio.

Figure 4F:
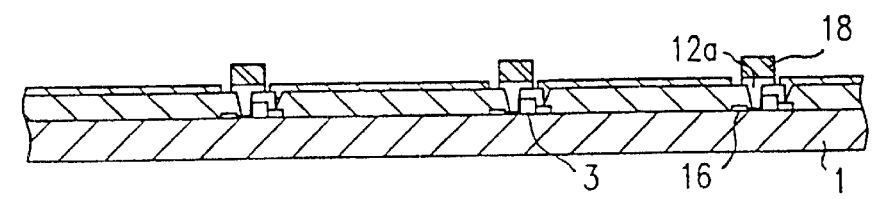

Next, as shown in FIG. 4F, a DC current is applied to the source bus line 16 without applying a voltage to the gate bus line 15 (not shown). Specifically, the insulative substrate 1 (on which the TFT 3, and the like, have been formed) is soaked in a chromium plating bath (containing 250 g·dm$^{-3}$ of chromic acid and 2.5 g·dm$^{-3}$ of sulfuric acid, maintained at a temperature between about 45° C. to about 50° C.). Then, the light-shielding layer 18 of Cr (thickness: 0.5 $\mu$m) is formed on the electrode 12a by employing an insoluble electrode of Pb as an anode and allowing a current to flow through the source bus line 16 at a cathode current density of 30 A·dm$^{-2}$ for about 13.3 seconds. At this time, any disruption in the source bus line 16 can be easily detected because the Cr light-shielding layer 18 will not form on portions of the electrode 12a extending beyond the disrupted point. Similarly, any leakage of current between the source bus line 16 and the gate bus line 15 or between the source bus line 16 and storage capacitance wiring (not shown) can be easily detected because such a leakage will result in the thickness of the light-shielding layer 18 being smaller than 0.5 $\mu$m.

Although the Cr light-shielding layer 18 is formed on the electrode 12a by an electrodeposition method in the present example, any other electrochemical method may alternatively be employed, e.g., a micell electrolysis method.

The light-shielding layer 18 may be composed of materials other than Cr; for example, a polyester/melanin resin anion type electrodeposition resin with a black pigment dispersed therein may be employed. A cation type electrodeposition resin is also a suitable electrodeposition resin. As for other pigments, a mixture including coloring pigments, e.g., red, blue, and green may also be employed.

Figure 4G:
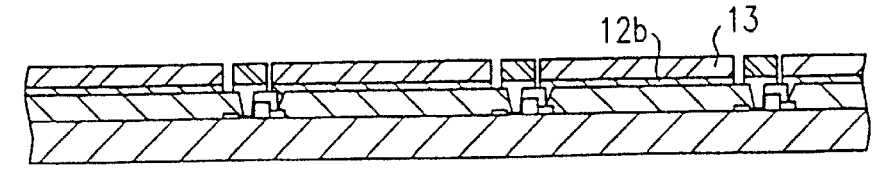
Figure 5:
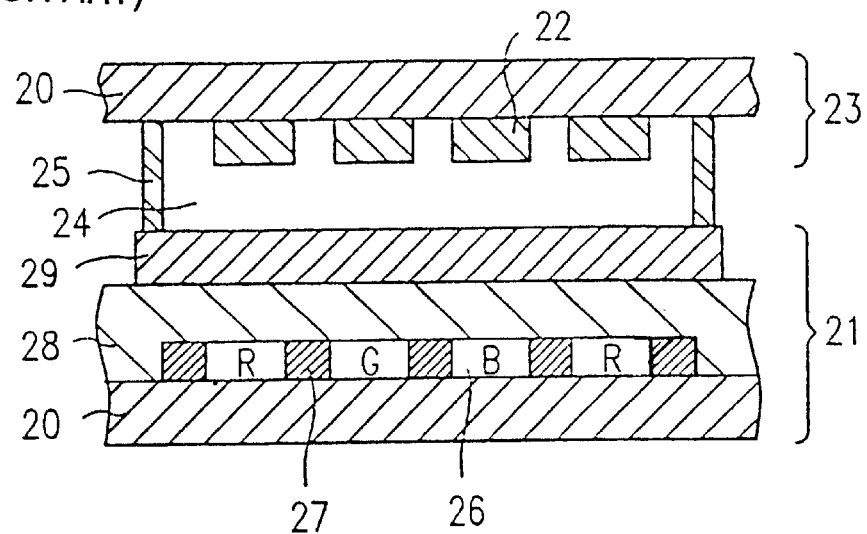
FIG. 5 is a cross-sectional view illustrating a conventional LC display device.
Figure 6:
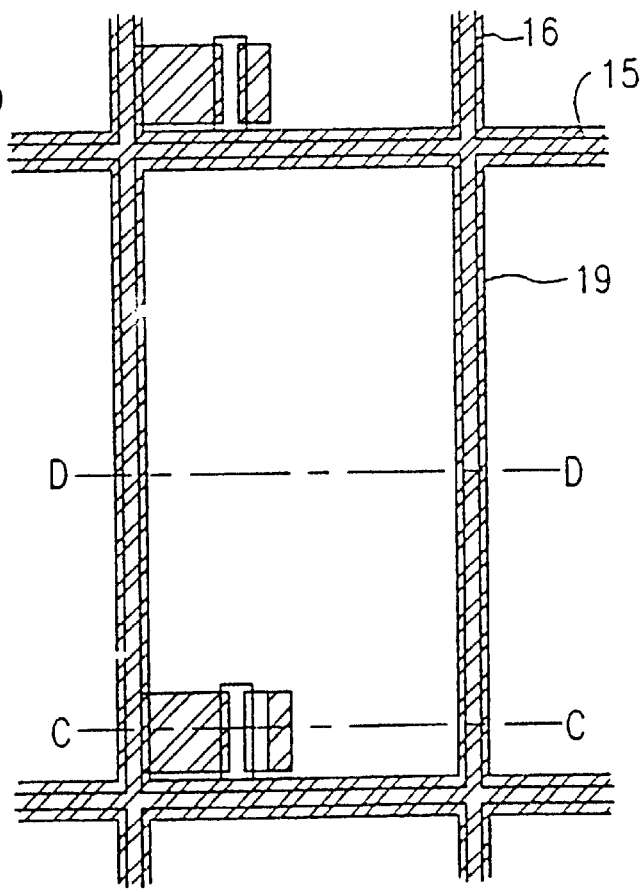
FIG. 6 is a plan view illustrating a conventional LC display device.
Figure 7:
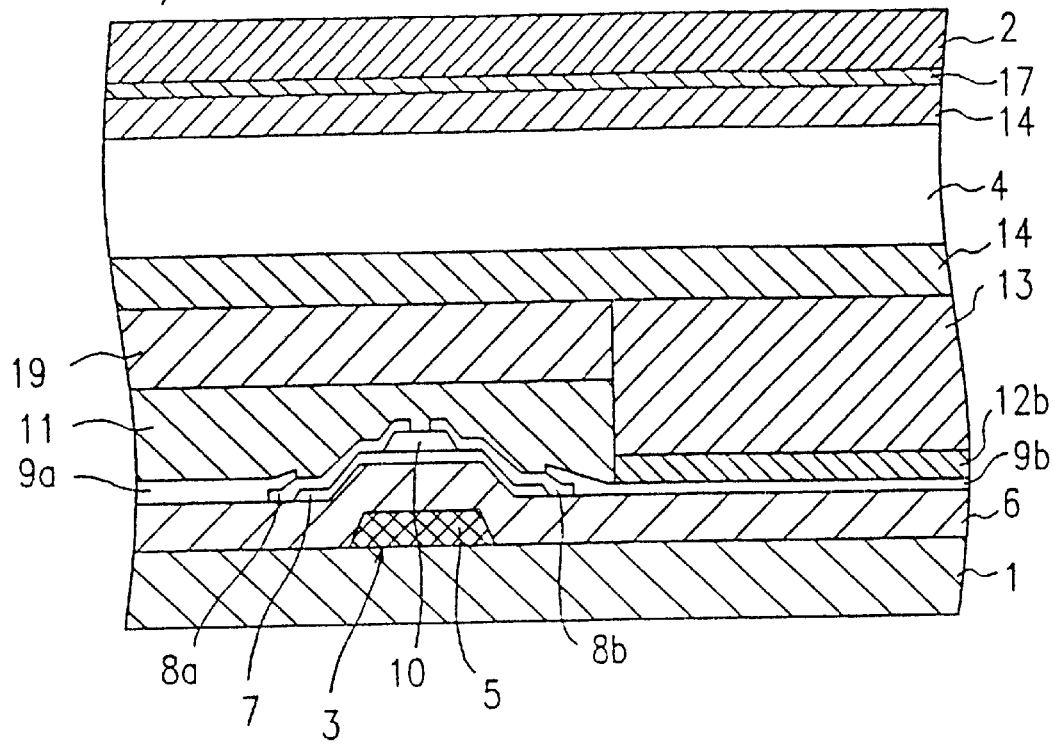
FIG. 7 is a cross-sectional view of the display device of FIG. 6 taken at line C—C.
Figure 8:
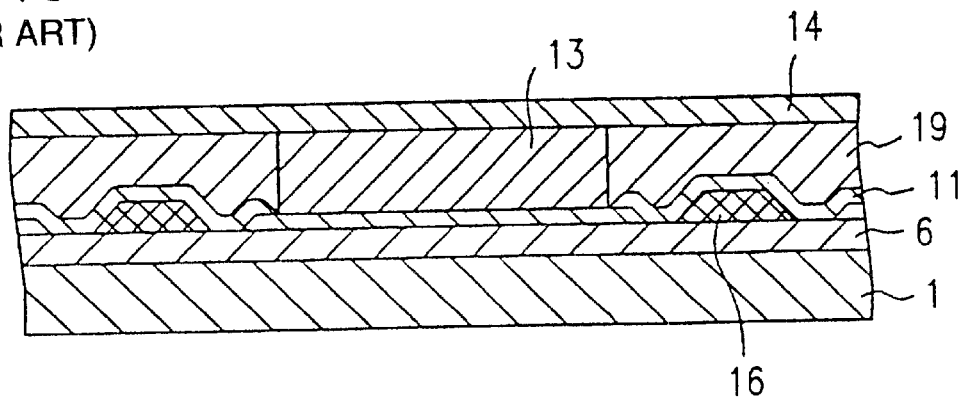
FIG. 8 is a cross-sectional view of the display device of FIG. 6 taken at line D—D.

Next, as shown in FIG. 4G, three colors of color filters 13 are formed on the electrode (pixel electrode) 12b by a micell electrolysis method.

First, about 1 to 2 g of a red pigment (Lithol Scarlet K370: manufactured by BASF) is added to and dispersed in a 2 mM aqueous solution of a compound (ferrocenyl polyethylene glycol, FPEG) expressed by the following formula:

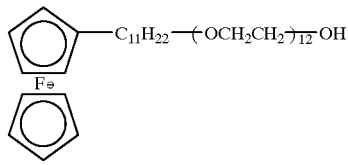

Next, 0.1 M of lithium bromide (supporting electrolyte) is added to the above solution, allowed to disperse for 30 minutes with an ultrasonic homogenizer, and stirred for 3 days with a stirrer, thereby preparing a red-colored dispersion solution. Similarly, a green-colored dispersion solution and a blue-colored dispersion solution are prepared by employing a green pigment (Meliogen Green L9361: manufactured by BASF) and a blue pigment (Meliogen Blue B7080: manufactured by BASF), respectively. Thus, a red-colored dispersion solution, a green-colored dispersion solution, and a blue-colored dispersion solution are separately prepared.

Next, the substrate obtained through the above steps is soaked in a red-colored dispersion solution, and signal lines corresponding to the red picture elements are electrically selected via a strip of electrode opening for the electrode lines for the red colored layer. Then, by employing a saturated calomel electrode and an aluminum plate as a reference electrode and a cathode, respectively, micell electrolysis is performed for about 30 minutes under a voltage of about 0.5 V and at a temperature of about 25° C. After the micell electrolysis is completed, the substrate is washed with purified water, baked for 1 hour at 180° C., thereby forming the red color filter 13 on the electrode (pixel electrode) 12b. The color filter 13 formed through the micell electrolysis loses its conductivity as a result of the baking process.

Similarly, the substrate obtained through the above steps is soaked in a green-colored dispersion solution, and signal lines corresponding to the green picture elements are electrically selected, whereby the green color filter 13 is formed. Since the red color filter has lost its conductivity through the baking process, the green color filter will not adhere to the already-existing red color filter. Similarly, the blue color filter 13 is formed for the corresponding picture elements.

The R, G, and B color filters 13 have respective thicknesses of 0.5 μm, 0.4 μm, and 0.6 μm.

Although the above example illustrated a case where the color filters 13 are formed on the electrodes (pixel electrodes) 12b by a micell electrolysis method, any electrochemical method may be used, e.g., an electrodeposition method.

As for the colored dispersion solutions for forming the color filters 13, aqueous solutions or aqueous dispersion of any polymer resin in which coloring pigments are dispersed may be used. As the polymer resin, an anion type resin obtained by neutralizing polyester resin having a carboxyl group with organic amine may also be used, for example.

Furthermore, on the insulative substrate 1 (on which the TFTs 3 and the color filters 13 have been formed), an alignment film 14 (of polyimide) is formed so as to have a thickness of 0.08 μm by offset printing. The surface of the alignment film 14 is subjected to an alignment process through rubbing or other techniques so that the alignment film 14 becomes capable of aligning LC molecules.

Next, across the entire surface of the insulative substrate 2 opposing the insulative substrate 1 (on which the TFTs 3 and the color filters 13 have been formed), a counter electrode 17 (of ITO) is formed, and an alignment film 14 (of polyimide or the like) is formed on the counter electrode 17. The alignment film 14 is subjected to an alignment process through rubbing or other techniques so that the alignment film 14 becomes capable of aligning LC molecules.

Thereafter, the substrate 2 is attached onto the substrate 1, with spacers (e.g., plastic beads) being dispersed in the interspace for retaining a constant distance between the substrates, and with sealants sealing the interspace. Liquid crystal 4 is injected into the interspace between the substrates, and the interspace is sealed, whereby a color LC display device has been produced.

The inventors have confirmed that a LC display device thus fabricated provides high brightness and excellent display quality.

EXAMPLE 2

As a second example of the present invention, a LC display device having a different function, i.e., so that it requires substantially no spacers, will be described. In the LC display device of the present example, too, an electrode 12a for facilitating the formation of a light-shielding layer and an electrode 12b for facilitating the formation of a color filter are provided so as to allow colored layers to be formed thereon by an electrochemical method.

In the following description, only the step of forming a colored layer on the electrode 12a for facilitating the formation of a light-shielding layer will be described. It should be understood that the other steps are similar to the steps described in Example 1.

First, as shown in FIGS. 4A to 4E, a TFT 3, a gate bus line 15, a source bus line 16, and the like are formed on an insulative substrate 1. An organic resin protection film 11 is further formed thereon. The electrode 12a for facilitating the formation of a light-shielding layer and the electrode (pixel electrode) 12b for facilitating the formation of a color filter are provided on the organic resin protection film 11.

Next, as shown in FIG. 4F, a DC current is applied to the source bus line 16 without applying a voltage to the gate bus line 15 (not shown). Specifically, the insulative substrate 1 (on which the TFT 3 and the like have been formed) is soaked in a chromium plating bath (as described in Example 1). Then, the light-shielding layer 18 of Cr (thickness: 4.5 μm) is formed on the electrode 12a by employing an insoluble electrode of Pb as an anode, whereby a current is allowed to flow through the source bus line 16 at a cathode current density of 30 A·dm$^{-2}$ for about 120 seconds. At this time, any disruption in the source bus line 16 can be easily detected because the Cr light-shielding layer 18 will not form on portions of the electrode 12a extending beyond the disrupted point. Similarly, any leakage of current between the source bus line 16 and the gate bus line 15 or between the source bus line 16 and storage capacitance wiring (not shown) can be easily detected because such a leakage will result in the thickness of the light-shielding layer 18 being smaller than 4.5 μm.

Although the Cr light-shielding layer 18 is formed on the electrode 12a by an electrodeposition method in the present example, any other electrochemical method may alternatively be employed, e.g., a micell electrolysis method.

The light-shielding layer 18 may be composed of materials other than Cr; for example, a polyester/melanin resin anion type electrodeposition resin with a black pigment dispersed therein may be employed. A cation type electrodeposition resin is also a suitable electrodeposition resin.

As for other pigments, a mixture including coloring pigments, e.g., red, blue, and green may be employed.

Next, as shown in FIG. 4G, three colors of color filters 13 are formed on the electrode (pixel electrode) 12b by a micell electrolysis method, in a similar manner to that described in Example 1.

Since the Cr light-shielding layer 18 formed on the electrode 12a has some conductivity, a portion of a color filter 13 is formed on the surface of the light-shielding layer 18. Assuming that the respective color filters 13 are formed in the same order as in Example 1, the red color filter, which is first formed on the light-shielding layer 18, loses its conductivity through a subsequent baking process so that a green color filter will not adhere to the already-existing red color filter, and so on.

Even if the color filter 13 is formed on the surface of the light-shielding layer 18 as mentioned above, the light-shielding film 18 maintains its intended function of intercepting light.

Next, as in Example 1, an alignment film 14 (of polyimide) is formed on the insulative substrate 1 (on which the TFTs 3 and the color filters 13 have been formed) so as to have a thickness of 0.08 µm, by offset printing. The surface of the alignment film 14 is subjected to an alignment process through rubbing or other techniques so that the alignment film 14 becomes capable of aligning LC molecules.

Next, across the entire surface of the insulative substrate 2 opposing the insulative substrate 1 (on which the TFTs 3 and the color filters 13 have been formed), a counter electrode 17 (of ITO) is formed, and an alignment film 14 (of polyimide or the like) is formed on the counter electrode 17. The alignment film 14 is subjected to an alignment process through rubbing or other techniques so that the alignment film 14 becomes capable of aligning LC molecules.

Thereafter, the substrate 2 is attached onto the substrate 1 with sealants sealing the interspace therebetween. Liquid crystal 4 is injected into the interspace between the substrates, and the interspace is sealed, whereby an active matrix type LC display device has been produced.

In Example 2, the light-shielding layer 18 is formed on the electrode 12a so as to have a thickness as large as about 4.5 µm. Thus, the light-shielding layer 18 can function as a spacer. As a result, there is substantially no need to disperse spacers such as plastic beads in the interspace between the substrates for retaining a constant distance. Therefore, the production process can be further simplified.

Furthermore, the portions of the color filters 13 provided on the surface of the light-shielding layer 18 provide electric insulation, thereby preventing the occurrence of current leaks between the substrates.

Since the light-shielding layer 18 on the electrode 12a is accurately patterned in a matrix shape on the insulative substrate 1, the cell thickness of the LC display device of the present example can be made uniform.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display device comprising:

an insulative substrate;

an active matrix element formed on the insulative substrate;

wiring formed on the insulative substrate for supplying a signal to the active matrix element;

an electrode formed on the insulative substrate so as to be electrically coupled to the active matrix element;

an insulation layer formed so as to at least partially overlay the wiring and the active matrix element;

a first electrode formed above the insulation layer so as to correspond to a channel region of the active matrix element;

a second electrode formed so as to correspond to a display region of a pixel;

a colored layer formed on the first electrode; and a colored layer formed on the second electrode.

2. A liquid crystal display device according to claim 1, wherein the colored layer formed on the first electrode is a light-shielding layer and the colored layer formed on the second electrode is a light-transmitting layer.

3. A liquid crystal display device according to claim 1, wherein the insulation layer is formed so as to overlay substantially all area covering the wiring, the active matrix element and a display region of the pixel, the first electrode and the second electrode being formed on the insulation layer.

4. A liquid crystal display device according to claim 1, wherein the active matrix element is a thin film transistor, the first electrode being electrically coupled to a source electrode of the thin film transistor, and the second electrode being electrically coupled to a drain electrode of the thin film transistor.

5. A liquid crystal display device according to claim 1, wherein the colored layer formed on the first electrode has a thickness which is substantially equal to a cell thickness.

* * * * *